United States Patent
Sakai (10) Patent No.: US 10,212,582 B2
(45) Date of Patent: Feb. 19, 2019

(54) COMMUNICATION APPARATUS, PROVIDING METHOD, AND PROGRAM

(71) Applicant: CANON KABUSHIKI KAISHA, Tokyo (JP)

(72) Inventor: Tatsuhiko Sakai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1 day.

(21) Appl. No.: 15/212,726

(22) Filed: Jul. 18, 2016

(65) Prior Publication Data

US 2017/0026828 A1 Jan. 26, 2017

(30) Foreign Application Priority Data

Jul. 21, 2015 (JP) ................ 2015-144396

(51) Int. Cl.
| | | |
|---|---|---|
| *H04W 8/24* | (2009.01) | |
| *H04W 4/06* | (2009.01) | |
| *H04W 12/06* | (2009.01) | |
| *H04W 12/04* | (2009.01) | |
| *H04W 84/12* | (2009.01) | |

(52) U.S. Cl.
CPC .............. *H04W 8/24* (2013.01); *H04W 4/06* (2013.01); *H04W 12/04* (2013.01); *H04W 12/06* (2013.01); *H04W 84/12* (2013.01)

(58) Field of Classification Search
CPC ....... H04L 63/08; H04L 9/0869; H04L 9/088; H04L 9/3271; H04L 9/3273; H04L 45/7453; H04W 12/06; H04W 84/12; H04W 12/04; H04W 4/008; H04W 8/005; H04W 92/02; H04W 92/20; H04W 28/18; H04W 76/10; H04W 88/06; H04W 12/02; H04W 12/08; H04W 40/246; H04W 8/24; H04W 4/06

See application file for complete search history.

(56) References Cited

U.S. PATENT DOCUMENTS

| | | | | |
|---|---|---|---|---|
| 7,984,295 | B2 * | 7/2011 | Oh ........................ | H04L 63/065 713/163 |
| 9,015,331 | B2 * | 4/2015 | Lai ......................... | H04L 63/10 709/226 |
| 9,125,237 | B2 * | 9/2015 | Goto ...................... | H04L 43/12 |
| 9,692,879 | B1 * | 6/2017 | Lack .................... | H04M 1/72577 |

(Continued)

FOREIGN PATENT DOCUMENTS

JP 2014-60623 A 4/2014

*Primary Examiner* — Wutchung Chu
(74) *Attorney, Agent, or Firm* — Canon USA Inc., IP Division (57) ABSTRACT

A communication apparatus includes a transmission unit that, when providing communication parameters for communication in a wireless network, transmits an authentication request message for requesting authentication by unicast in a case where a transmission destination of the authentication request message is identified and transmits the authentication request message by broadcast in a case where a transmission destination of the authentication request message is not identified, a reception unit that receives a response message responding to the authentication request message from another communication apparatus, and a provision unit that provides the another communication apparatus with the communication parameters upon receipt of the response message.

12 Claims, 7 Drawing Sheets

(56) References Cited

U.S. PATENT DOCUMENTS

| | | | |
|---|---|---|---|
| 2003/0064752 A1* | 4/2003 | Adachi | H04L 63/08 455/560 |
| 2006/0168253 A1* | 7/2006 | Baba | H04L 9/3271 709/229 |
| 2007/0115975 A1* | 5/2007 | Zhang | H04L 12/18 370/390 |
| 2007/0189249 A1* | 8/2007 | Gurevich | H04L 45/20 370/338 |
| 2008/0126455 A1* | 5/2008 | Francfort | H04L 63/08 708/200 |
| 2010/0293370 A1* | 11/2010 | Xiao | H04L 63/061 713/155 |
| 2011/0188658 A1* | 8/2011 | Sakai | H04L 63/065 380/278 |
| 2011/0189958 A1* | 8/2011 | Goto | H04W 84/20 455/62 |
| 2011/0191473 A1* | 8/2011 | Sakai | H04W 8/005 709/224 |
| 2011/0200043 A1* | 8/2011 | Huang | H04L 12/1886 370/390 |
| 2012/0284193 A1* | 11/2012 | Bharghavan | H04L 9/3263 705/64 |
| 2013/0176897 A1* | 7/2013 | Wang | H04W 12/06 370/254 |
| 2016/0006739 A1* | 1/2016 | Huang | H04L 63/101 726/5 |
| 2017/0026834 A1* | 1/2017 | Nakajima | H04W 4/80 |

\* cited by examiner

COMMUNICATION APPARATUS, PROVIDING METHOD, AND PROGRAM

BACKGROUND

Field

Aspects of the present invention generally relate to an apparatus for providing communication parameters.

Description of the Related Art

When a communication apparatus is to be connected to a wireless network, it is necessary to set various communication parameters such as the encryption method, the encryption key, the authentication method, and the authentication key. A technique for facilitating setting of these communication parameters is discussed in Japanese Patent Application Laid-Open No. 2014-60623. In the technique discussed in Japanese Patent Application Laid-Open No. 2014-60623, a communication apparatus displays a Quick Response (QR) Code® indicating communication parameters. Then, another communication apparatus captures and reads an image of the QR Code®, and sets the read communication parameters to an access point.

As with the technique discussed in Japanese Patent Application Laid-Open No. 2014-60623, user's complicated input operations can be reduced by setting communication parameters upon capturing of an image of code information allowing much information to be encoded, such as a two-dimensional code.

Further, to enable communication apparatuses to directly connect with each other, connection processing called Wi-Fi Direct® enacted by Wi-Fi Alliance® is stipulated as a standard. When communication parameters are set in Wi-Fi Direct®, an apparatus intended for wireless connection transmits a search request message (probe) by broadcast on a predetermined wireless channel, and, when a search response message is received from an other end apparatus, detects the other end apparatus. After the detection, the apparatus transmits a communication parameter setting message by unicast to the detected other end apparatus to share the communication parameters and establish wireless connection.

In setting of communication parameters in Wi-Fi Direct®, the communication apparatus first transmits a search message by broadcast to detect the other end apparatus and then transmits the communication parameter setting message by unicast to the detected other end apparatus. More specifically, the communication apparatus transmitted two different messages to the same other end apparatus, resulting in low efficiency communication.

On the other hand, by transmitting a communication parameter setting message by broadcast in such a manner that it also serves as a search message, the efficiency of communication can be improved in comparison with the above-described processing.

In this case, however, many unspecified apparatuses existing around are able to receive the communication parameter setting message. This increases a risk that a communication parameter is set to an unintended apparatus and a denial-of-service attack is received from the unintended apparatus, which possibly degrades security.

SUMMARY

Aspects of the present invention are directed to efficiently providing communication parameters while reducing security risks.

According to an aspect of the present invention, a communication apparatus includes a transmission unit configured to, when providing communication parameters for communication in a wireless network, transmit an authentication request message for requesting authentication by unicast in a case where a transmission destination of the authentication request message is identified and by broadcast in a case where a transmission destination of the authentication request message is not identified, a reception unit configured to receive, from another communication apparatus, a response message for the authentication request message, and a provision unit configured to provide the another communication apparatus with the communication parameters upon receipt of the response message.

Further features of aspects of the present invention will become apparent from the following description of exemplary embodiments with reference to the attached drawings.

DESCRIPTION OF THE EMBODIMENTS

A communication apparatus according to the present exemplary embodiment will be described in detail below with reference to the accompanying drawings. The following example uses a wireless local area network (LAN) system conforming to the Institute of Electrical and Electronics Engineers, Inc. (IEEE) 802.11 series. However, the communication form is not limited to a wireless LAN conforming to the IEEE 802.11 series. For example, the present exemplary embodiment is also applicable to a communication apparatus conforming to other wireless communication methods such as Bluetooth® and ZigBee. The present exemplary embodiment is also applicable to a communication apparatus conforming to a wired communication method such as a wired LAN.

Figure 3:
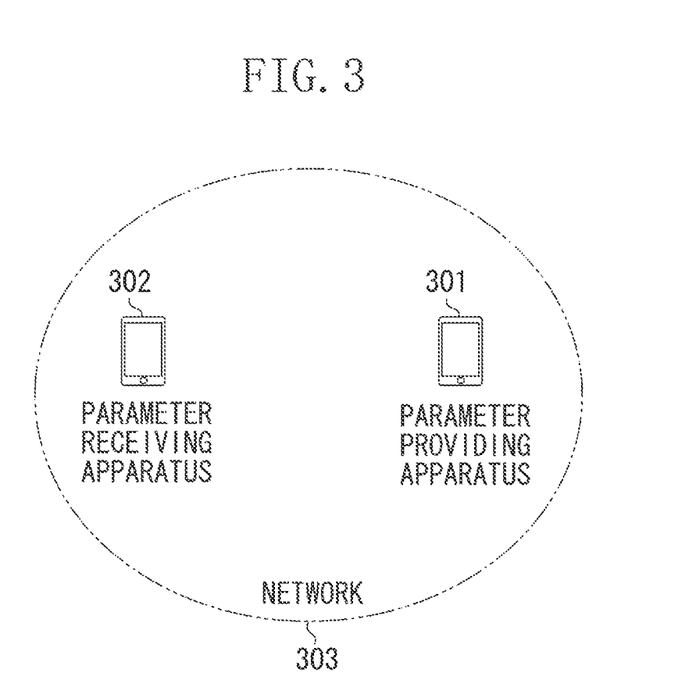
FIG. 3 illustrates a configuration of a communication system.

FIG. 3 illustrates a communication system according to the present exemplary embodiment. The communication system illustrated in FIG. 3 includes a smart phone 301 (hereinafter referred to as a providing apparatus 301) as a communication parameter providing apparatus and a smart phone 302 (hereinafter referred to as a receiving apparatus 302) as a communication parameter receiving apparatus.

A wireless network 303 is a network constructed by the providing apparatus 301. In the present exemplary embodiment, the providing apparatus 301 and the receiving apparatus 302 perform the communication parameter setting processing described below with reference to FIGS. 4, 5, 6, and 7, and the providing apparatus 301 provides the receiving apparatus 302 with communication parameters of the wireless network 303. The receiving apparatus 302 connects to the wireless network 303 by using the received communication parameters. In this case, the communication parameters include Service Set Identifier (SSID) which is the identifier of the wireless network constructed by an access point (AP), and the encryption method, the encryption key, the authentication method, and the authentication key used for the wireless network. The communication parameters can include one of the above-described parameters.

Although, in the present exemplary embodiment, an apparatus used in the communication system is a smart phone for the purpose of illustration, it can be different apparatus such as a printer, a mobile phone, a personal computer (PC), a video camera, a smart watch, and a personal digital assistant (PDA). Although, in the present exemplary embodiment, the smart phone 301 is described which operates as a providing apparatus, and the smart phone 302 is described which operates as a receiving apparatus, the apparatus is not limited thereto. When the smart phone 302 has already formed a network, the smart phone 301 can acquire the communication parameters from the smart phone 302.

Figure 1:
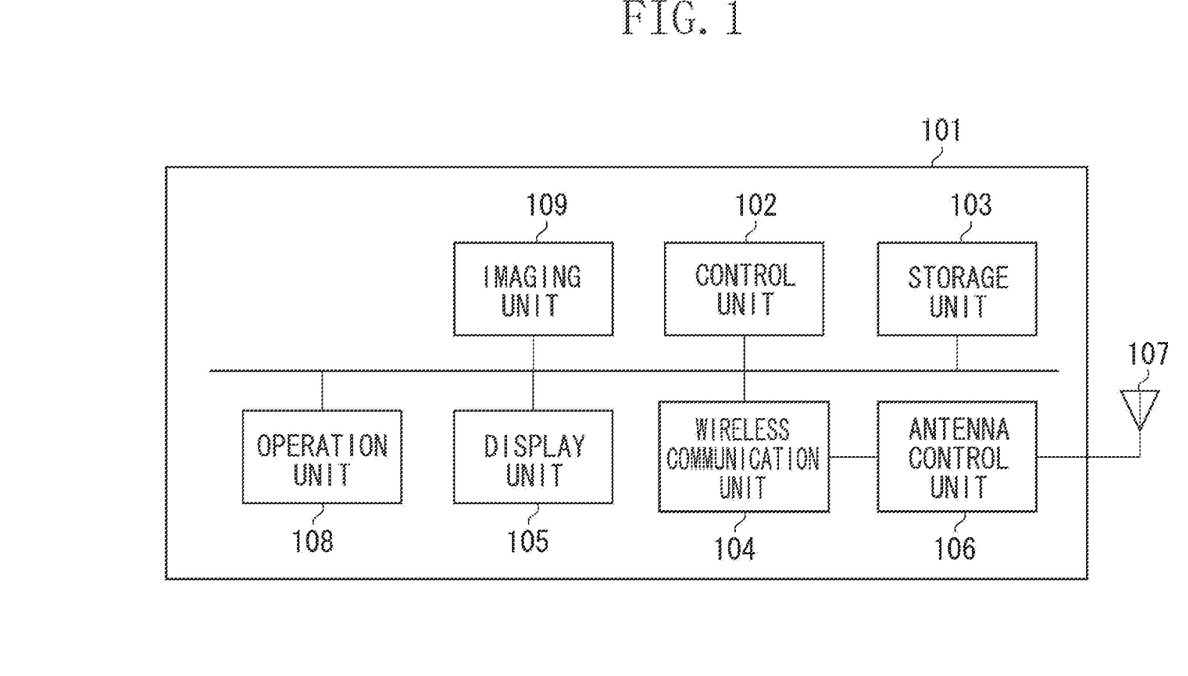
FIG. 1 illustrates a hardware configuration of a communication apparatus.

A hardware configuration of each apparatus (the providing apparatus 301 and the receiving apparatus 302) in the communication system illustrated in FIG. 3 will be described below with reference to FIG. 1. FIG. 1 illustrates an entire apparatus 101. A control unit 102 controls the entire apparatus 101 by executing a control program stored in a storage unit 103. The control unit 102 includes, for example, a central processing unit (CPU). The storage unit 103 stores a control program executed by the control unit 102 and various information such as image data and communication parameters. Various operations (described below) are implemented when the control unit 102 executes a control program stored in the storage unit 103. The storage unit 103 includes storage media such as a hard disk drive (HDD), a flash memory, a read only memory (ROM), a random access memory (RAM), and a detachably attached secure digital (SD) card.

A wireless communication unit 104 performs wireless LAN communication conforming to the IEEE 802.11 series. The wireless communication unit 104 includes a chip for performing wireless communication. A display unit 105 such as a liquid crystal display (LCD) and a light emitting diode (LED) performs various display, and has a function of outputting visually recognizable information, or a function of outputting sound as a speaker, for example. The display unit 105 is provided with a function of outputting at least one of visual information and sound information. The display unit 105 includes a video RAM (VRAM) storing image data corresponding to display target visual information when displaying the visual information. The display unit 105 performs display control to continue displaying image data stored in the VRAM on the LCD or LED.

An antenna control unit 106 controls the output of an antenna 107 capable of wireless LAN communication at a 2.4-GHz band and/or a 5-GHz band. An operation unit 108 enables a user to input various information to operate the communication apparatus 101.

An imaging unit 109 includes an image sensor, lenses, etc., and captures photograph and moving images. In the present exemplary embodiment, the imaging unit 109 reads code of two-dimensional information such as a bar code and the QR Code®.

Figure 2:
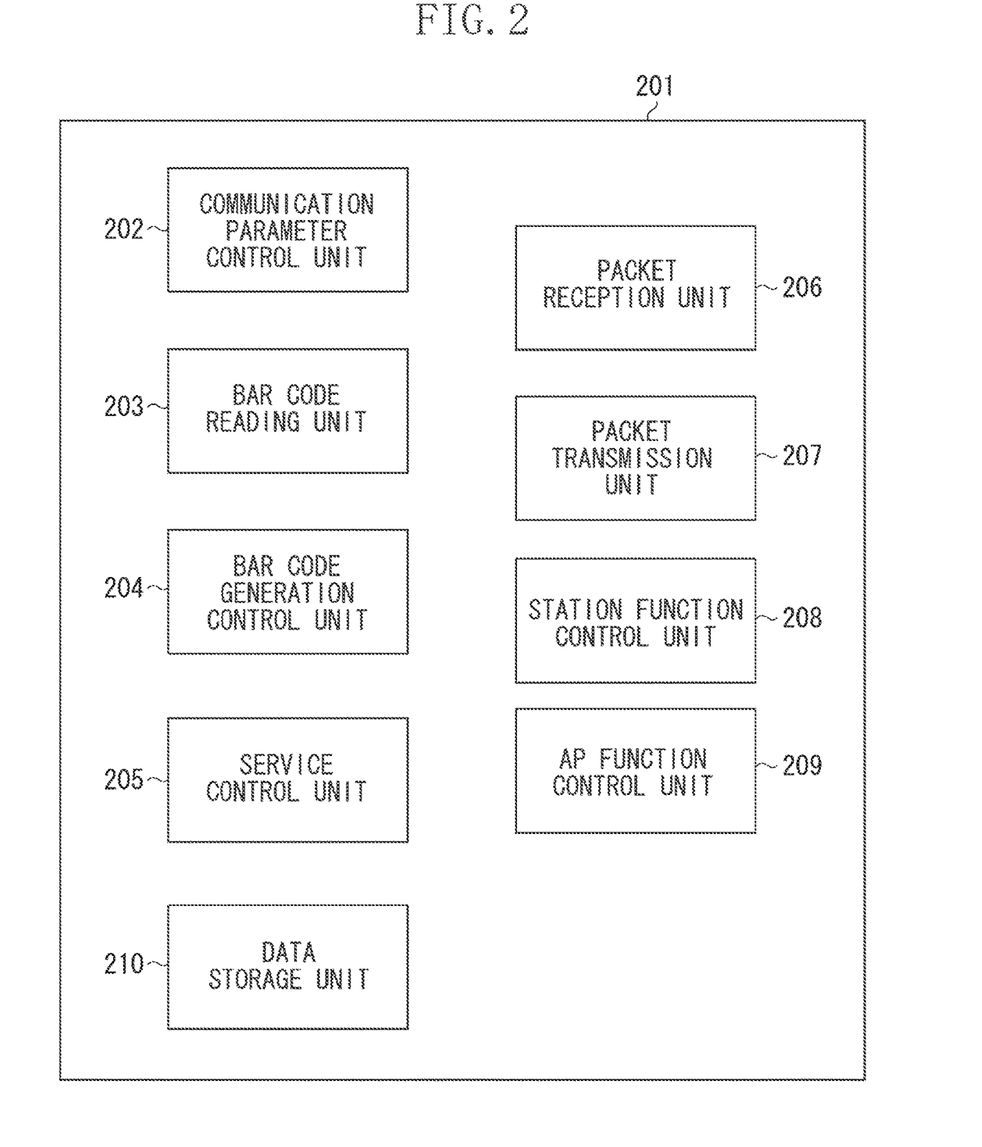
FIG. 2 illustrates a software function configuration of the communication apparatus.

FIG. 2 illustrates a configuration of software function blocks for performing communication control functions (described below). Function blocks of each apparatus are stored in the storage unit 103 as programs. The function of each function block is implemented when the control unit 102 executes each program. The control unit 102 implements each function by controlling each hardware component and calculating and processing information according to a control program. A part or whole of the function blocks can be implemented by hardware. In this case, each hardware block includes, for example, an application specific integrated circuit (ASIC).

FIG. 2 is a block diagram illustrating software function blocks, i.e., a software function configuration 201, of the communication apparatus 101. A communication parameter control unit 202 performs the communication parameter setting processing for sharing communication parameters between communication apparatuses. In the communication parameter setting processing according to the present exemplary embodiment, the providing apparatus 301 reads the QR Code® displayed by the receiving apparatus 302 to acquire information required to set the communication parameters included in the read QR Code®. The information required to set the communication parameters include, for example, the communication parameters themselves, the identification information of the receiving apparatus 302, and the identification information for automatic communication parameter setting.

Then, the providing apparatus 301 stores in the storage unit 103 the identification information of the receiving apparatus 302 included in the read QR Code®. The identification information of the receiving apparatus 302 is the Media Access Control (MAC) address and the Universally Unique Identifier (UUID) for uniquely identifying a network apparatus.

After storage, the providing apparatus 301 provides the receiving apparatus 302 with communication parameters of the wireless network 303 via a packet transmission unit 207. The receiving apparatus 302 participates in the wireless network 303 based on the received communication parameters. Communication apparatuses can communicate to each other communication parameters encrypted by using a public key or certificate in the communication parameter setting. The public key can be included in the QR Code®.

When the providing apparatus 301 provides the receiving apparatus 302 with communication parameters, the providing apparatus 301 can confirm that the apparatus providing a communication parameter by the public key authentication method is the receiving apparatus 302, based on the public key included in the QR Code® of the receiving apparatus 302.

In this case, the communication parameters include wireless communication parameters required to perform wireless LAN communication, such as Service Set Identifier (SSID) as the network identifier, the encryption method, the encryption key, the authentication method, and the authentication key. The communication parameters can include any one of the above-described parameters. The communication parameters can also include the MAC address, the passphrase, and the IP address for performing communication in the Internet Protocol (IP) layer, and information required for upper level services.

A bar code reading unit 203 analyzes the image captured by the imaging unit 109 to acquire encoded code information. The bar code reading unit 203 performs processing for analyzing two-dimensional code information such as the bar code and the QR Code®.

A bar code generation control unit 204 generates two-dimensional code information such as the bar code and the QR Code®, and performs control to display the generated code information on the display unit 105. The bar code generation control unit 204 displays the QR Code® with encoded information required for communication parameter setting according to a communication parameter setting application for setting the communication parameters to be stored in the storage unit 103.

A service control unit 205 in the application layer performs print processing, image streaming processing, file transfer processing, etc. by using wireless communication by the wireless communication unit 104. The application layer refers to a service providing layer in the fifth and upper layers in the Open Systems Interconnection (OSI) reference model.

A packet reception unit 206 and a packet transmission unit 207 control reception and transmission of all packets including communication protocols of upper layers, respectively. The packet reception unit 206 and the packet transmission unit 207 further control the wireless communication unit 104 to perform packet reception and transmission conforming to the IEEE 802.11 standard from/to the other end apparatus.

A station function control unit 208 provides the apparatus with STA functions which operates as a station (STA) in the infrastructure mode defined in the IEEE 802.11 standard. When the apparatus operates as a STA, the STA function control unit 208 performs authentication, encryption processing, etc. An AP function control unit 209 provides AP functions for operation as an access point (AP) in the infrastructure mode defined in the IEEE 802.11 standard. The AP function control unit 209 forms a wireless network, and performs authentication and encryption processing for the STA and management of the STA. A data storage unit 210 performs control to write and read software itself, communication parameters, and bar code information to/from the storage unit 103.

Figure 4:
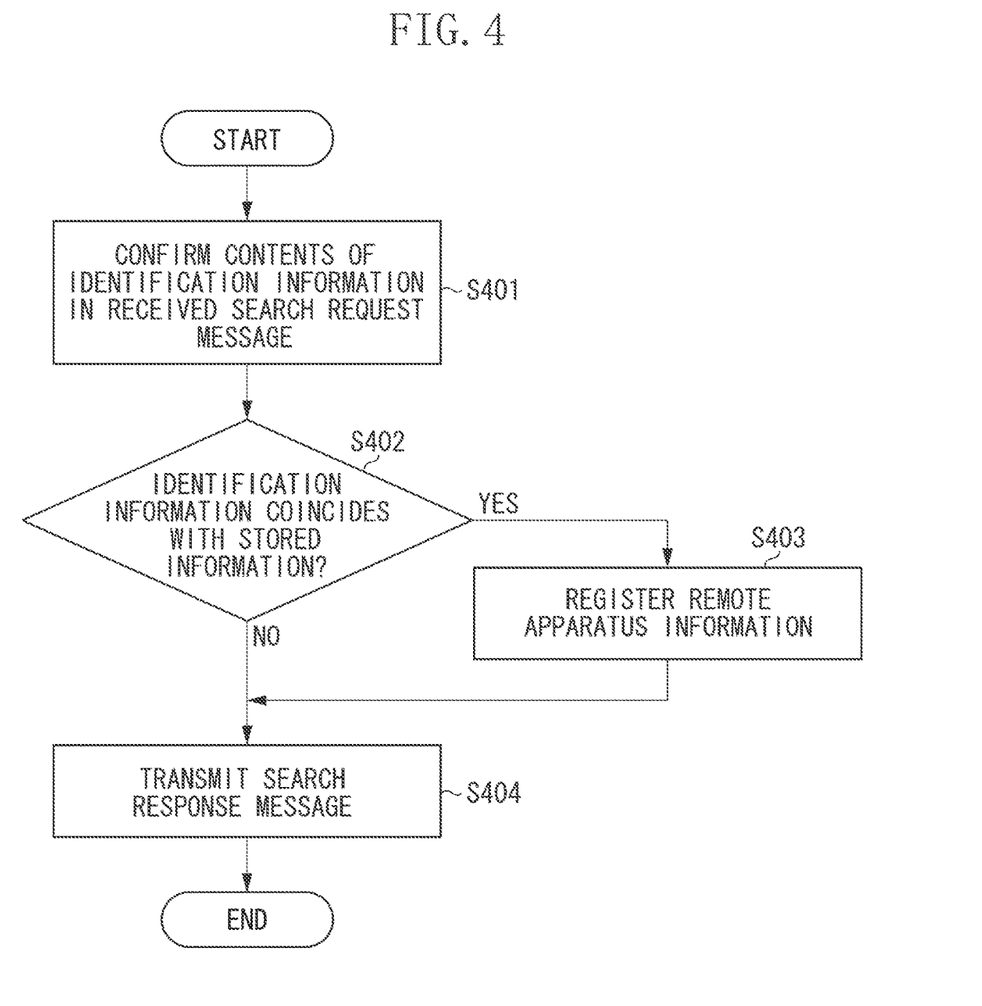
FIG. 4 is a flowchart illustrating processing implemented by a providing apparatus.
Figure 5:
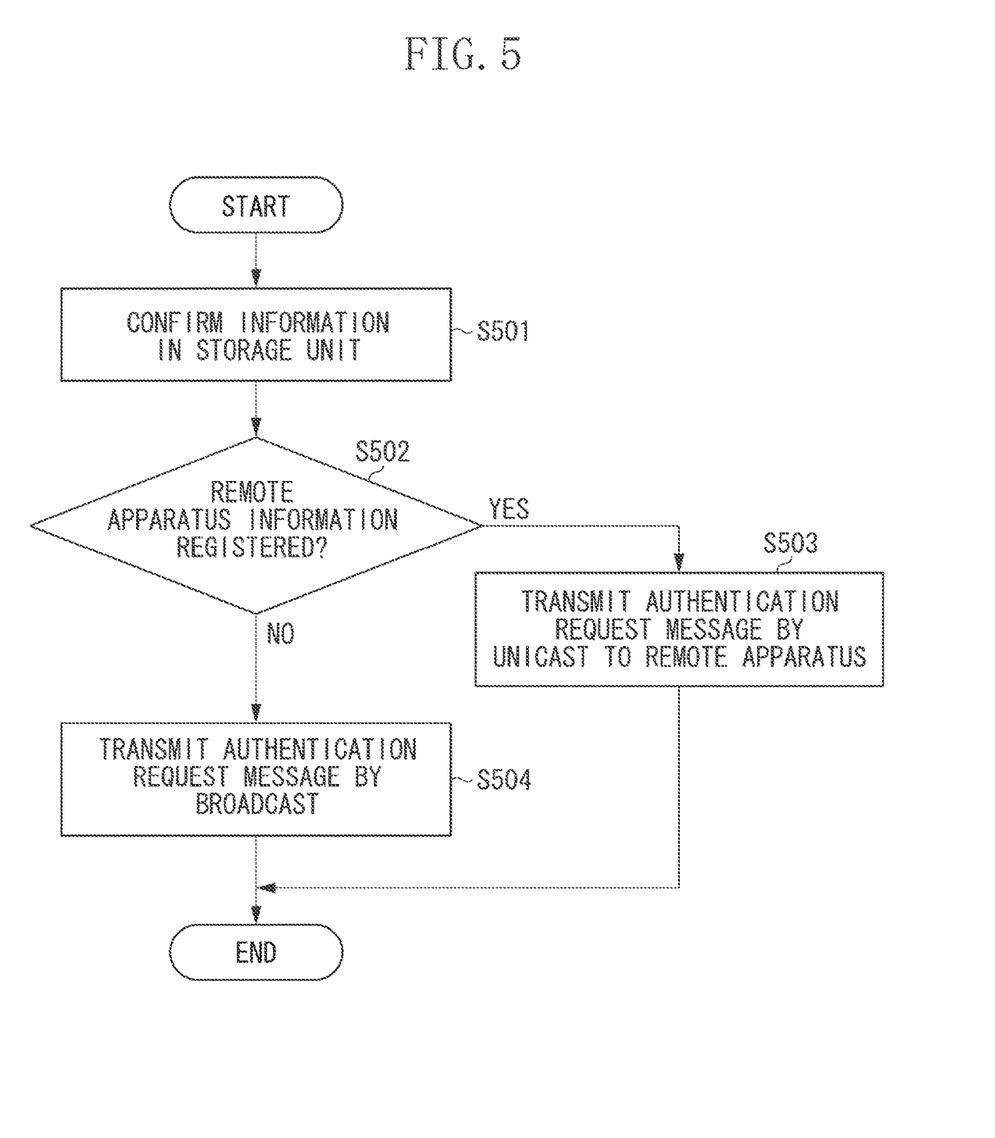
FIG. 5 is a flowchart illustrating processing implemented by the providing apparatus.

Operations of the providing apparatus 301 according to the present exemplary embodiment will be described below with reference to the flowcharts illustrated in FIGS. 4 and 5. The flowcharts illustrated in FIGS. 4 and 5 are implemented when the control unit 102 reads and executes a computer program stored in the storage unit 103. A part or whole of steps of the flowcharts illustrated in FIGS. 4 and 5 can be implemented by hardware such as an ASIC.

FIG. 4 is a flowchart illustrating search request reception processing performed by the providing apparatus 301 upon reception of a search request message from another apparatus. The flowchart illustrated in FIG. 4 is started when the packet reception unit 206 receives a search request message.

Upon reception of a search request message, in step S401, the providing apparatus 301 confirms the contents of the identification information included in the received search request message. In step S402, the providing apparatus 301 determines whether the contents of the received identification information coincides with the contents of the identification information of the receiving apparatus 302 stored in the storage unit 103. The identification information of the receiving apparatus 302 stored in the storage unit 103 is the identification information read from the QR Code® by the providing apparatus 301 before execution of the flowchart illustrated in FIG. 4. The QR Code® can be displayed or printed by the receiving apparatus 302, or can be stuck on the apparatus housing, the operation manual, or the packing material of the receiving apparatus 302.

When the contents of the identification information are matched (YES in step S402), the providing apparatus 301 determines that the transmission source apparatus of the search request message is the receiving apparatus 302. Then, the processing proceeds to step S403. In step S403, the providing apparatus 301 stores the MAC address of the transmission source apparatus in the storage unit 103 as other end apparatus information. In step S404, the providing apparatus 301 transmits a search response message to the transmission source apparatus.

On the other hand, when the contents of the identification information are mismatched (NO in step S402), then in step S404, the providing apparatus 301 transmits the search response message to the transmission source apparatus of the search request message, without registering the other end apparatus information. Then, the processing exits the flowchart.

The identification information included in the search request message can be at least one of the MAC address, the UUID, and the public key, or can be the hash value of the information. In the case of the hash value, in step S402, the providing apparatus 301 calculates the hash value of the information stored in the storage unit 103 and determines whether the contents of the two hash values are matched.

The search request message and the search response message can be other predetermined signals such as a probe request signal (search request signal) and a probe response signal (search response signal), respectively, defined in the IEEE 802.11 standard.

FIG. 5 is a flowchart illustrating processing performed by the providing apparatus 301 to transmit an authentication request message which is transmitted for authentication processing based on the public key authentication method.

In step S501, the providing apparatus 301 confirms the other end apparatus information stored in the storage unit 103. In step S502, the providing apparatus 301 confirms whether the other end apparatus information is registered.

When the other end apparatus information is registered (YES in step S502), then in step S503, the providing apparatus 301 transmits the authentication request message to the transmission destination specified by the MAC address stored as the other end apparatus information, Then, the processing exits the flowchart.

On the other hand, when the other end apparatus information is not registered (NO in step S502), then in step S504, the providing apparatus 301 transmits the authentication request message to the transmission destination specified by a broadcast address. Then, the processing exits the flowchart. Instead of broadcast transmission, the providing apparatus 301 can transmit the message by multicast to a predetermined multicast group. In other words, when the other end apparatus information is not registered, the providing apparatus 301 transmits the authentication request message by broadcast.

As described above, when the transmission destination of the authentication request message for requesting authentication processing is identified, the providing apparatus 301 transmits the authentication request message by unicast. On the other hand, when the transmission destination of the authentication request message is not identified, the providing apparatus 301 transmits the authentication request message by broadcast.

Figure 6:
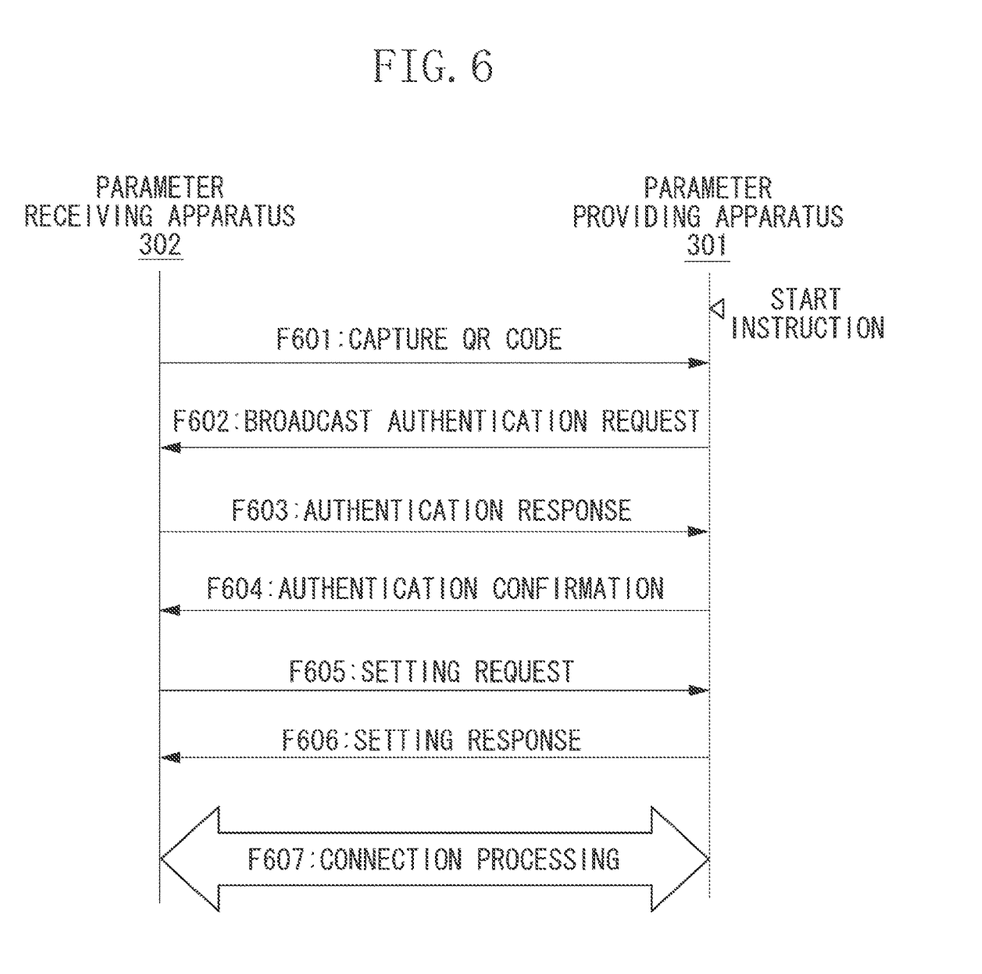
FIG. 6 is a sequence diagram illustrating processing between communication apparatuses.

FIG. 6 is a first sequence diagram illustrating the communication parameter setting using the QR Code® between the thus-configured providing apparatus 301 and the receiving apparatus 302. In the sequence diagram illustrated in FIG. 6, the providing apparatus 301 confirms the receiving apparatus 302 based on the public key authentication method.

When a parameter setting start instruction via the operation unit 108 is received, in step F601, the providing apparatus 301 activates the imaging unit 109 and captures an image of the QR Code® attached to or displayed on the receiving apparatus 302 to acquire the public key included in the QR Code®. When the QR Code® does not include the identification information, such as a public key, the providing apparatus 301 ends the communication parameter setting processing as an error.

After capturing an image, the providing apparatus 301 performs the processing illustrated in FIG. 5. The other end apparatus information has not yet been registered (NO in step S502). In step F602, the providing apparatus 301 transmits the authentication request message by broadcast.

In step F602, the receiving apparatus 302 receives the authentication request message. In step F603, the receiving apparatus 302 transmits to the providing apparatus 301 an authentication response message storing information required by the providing apparatus 301 to implement the public key authentication method.

In step F603, the providing apparatus 301 performs the public key authentication method by using the information in the received authentication response message and the public key acquired in step F601, and confirms that the transmission source apparatus of the authentication response message is the receiving apparatus 302 which has captured the QR Code® in step F601.

After confirmation, in step F604, the providing apparatus 301 transmits to the receiving apparatus 302 an authentication confirmation message to notify completion of confirmation by the public key authentication method.

Upon reception of the authentication confirmation message, in step F605, the receiving apparatus 302 transmits a parameter setting request message for requesting to provide a communication parameter, to the providing apparatus 301.

In step F605, the providing apparatus 301 receives the parameter setting request message from the receiving apparatus 302. In step F606, in response to the parameter setting request message, the providing apparatus 301 transmits a setting response message including the communication parameters of the wireless network 303. After transmission, in step F607, the providing apparatus 301 constructs the wireless network 303 based on the provided communication parameters.

In step F607, the receiving apparatus 302 connects to the wireless network 303 by using the communication parameters of the wireless network 303 included in the setting response message.

As described above, when the providing apparatus 301 transmits the authentication request message by broadcast, it becomes possible to efficiently perform public key authentication between the providing apparatus 301 and the receiving apparatus 302, without exchanging a search request message and a search response message.

Figure 7:
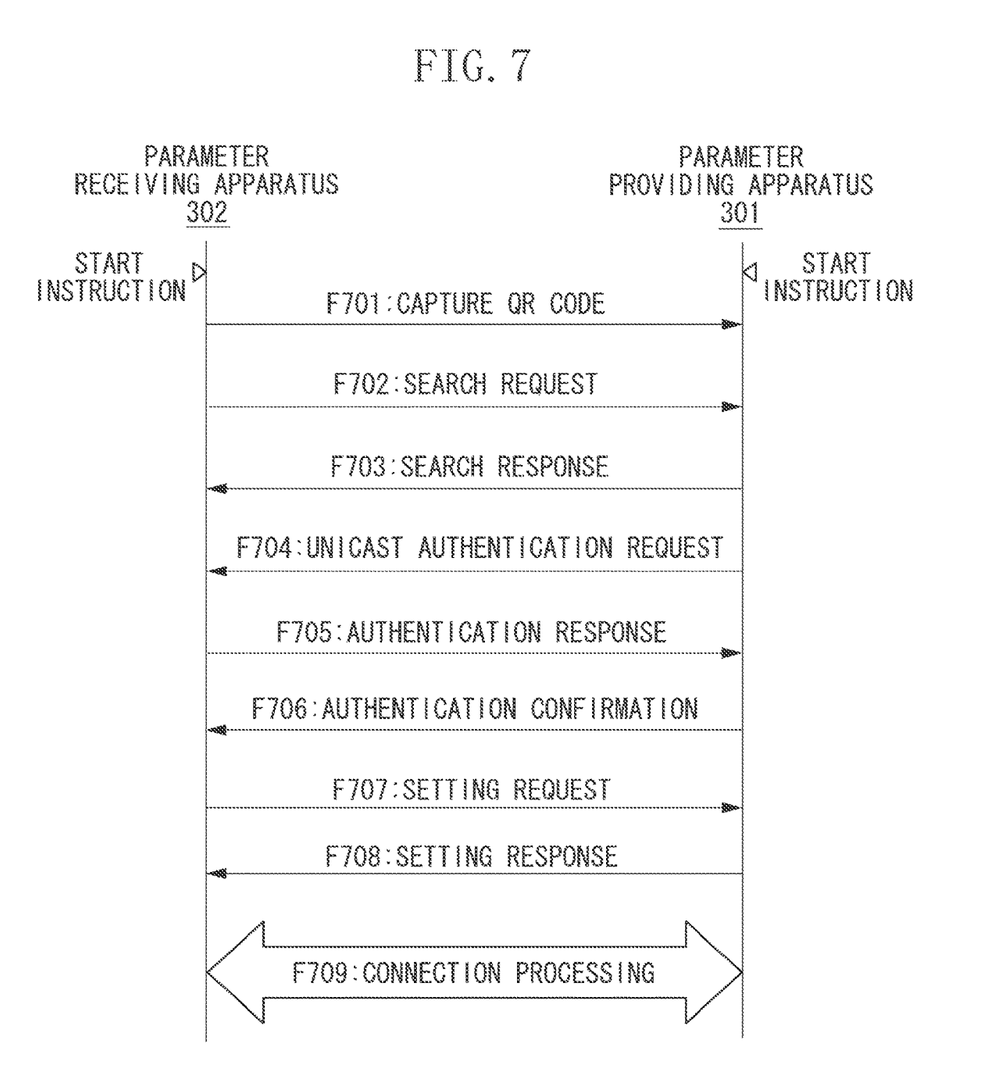
FIG. 7 is a sequence diagram illustrating processing between communication apparatuses.

FIG. 7 is a second sequence diagram illustrating the communication parameter setting using the QR Code® between the providing apparatus 301 and the receiving apparatus 302.

Upon reception of the parameter setting start instruction from the user via the operation unit 108, in step F701, the receiving apparatus 302 receives the QR Code® storing the public key and displays the code on the display unit 105. In step F702, the receiving apparatus 302 transmits the search request message to the parameter providing apparatus 301. The search request message stores the public key hash value as identification information.

Upon reception of the parameter setting start instruction from the user via the operation unit 108, in step F701, the providing apparatus 301 activates the imaging unit 109 and captures an image of the QR Code® of the receiving apparatus 302 to acquire the public key included in the QR Code®.

Upon reception of the search request message, the providing apparatus 301 performs the processing illustrated in FIG. 4 and confirms that the identification information (public key hash value) included in the search request message coincides with the public key hash value acquired in step F701 (YES in step S402). After confirmation, in steps S403 and F702, the providing apparatus 301 stores in the storage unit 103 the other end apparatus information, which takes the receiving apparatus 302 (the transmission source apparatus of the search request message) as the other end apparatus.

In step F703, the providing apparatus 301 transmits the search response message to the receiving apparatus 302.

The providing apparatus 301 performs the processing illustrated in FIG. 5 and confirms that the other end apparatus information has been registered (YES in step S502). In step F704, the providing apparatus 301 transmits the authentication request message by unicast to the receiving apparatus 302.

Upon reception of the authentication request message, in step F705, the receiving apparatus 302 transmits to the providing apparatus 301 the authentication response message storing information required by the providing apparatus 301 to implement the public key authentication method.

In step F705, the providing apparatus 301 performs the public key authentication method by using the information in the received authentication response message and the public key acquired in step F701, and confirms that the transmission source apparatus of the authentication response message is the receiving apparatus 302 which has captured an image of the QR Code® in step F701.

After confirmation, then in step F706, the providing apparatus 301 transmits to the receiving apparatus 302 the authentication confirmation message to notify completion of confirmation by the public key authentication method.

Upon reception of the authentication confirmation message, in step F707, the receiving apparatus 302 transmits the parameter setting request message requesting to provide a communication parameter, to the providing apparatus 301.

In step F707, the providing apparatus 301 receives the parameter setting request message from the receiving apparatus 302. In step F708, as a response, the providing apparatus 301 transmits the setting response message including the communication parameters of the wireless network 303. After transmission, in step F709, the providing apparatus 301 constructs the wireless network 303 based on the provided communication parameters.

In step F709, the receiving apparatus 302 connects to the wireless network 303 by using the communication parameters of the wireless network 303 included in the setting response message.

As described above, when the providing apparatus 301 identifies the receiving apparatus 302 as the other end apparatus by using the identification information included in the search request message, it becomes possible to transmit the authentication request message only to the receiving apparatus 302. Thus, security risks are reduced that communication parameter setting processing is performed with an unintended apparatus existing in the surroundings and a denial-of-service attack is received from an unintended apparatus.

Before the providing apparatus 301 receives a search request message in step F702, the providing apparatus 301 can transmit, by broadcast, the authentication request message described with reference to FIG. 6. Further, the providing apparatus 301 can stop the broadcast transmission upon reception of the search request message in step F702.

The providing apparatus 301 can also stop the broadcasting transmission after a predetermined time period has elapsed.

Although, in the present exemplary embodiment, the providing apparatus 301 provides the receiving apparatus 302 with the communication parameters of the wireless network 303 which the providing apparatus 301 itself constructs in steps F606 and F708, the providing apparatus 301 can provide the receiving apparatus 302 with communication parameters configured by other apparatus.

In the above-described exemplary embodiment, information for setting the communication parameters is exchanged between apparatuses by capturing an image of the QR Code®. However, instead of capturing an image of the QR Code®, wireless communication such as Near Field Communication (NFC), Bluetooth®, furthermore IEEE 802.11 ad, or TransferJet® can be used.

The QR Code® to be read is not limited to the QR Code® displayed on the display unit 105, and can be a QR Code® put on a seal stuck on the housing of the communication apparatus 101. The QR Code® to be read can also be a QR Code® stuck on an accessory of the communication apparatus 101, such as the operation manual and the packing material (corrugated paper, etc.) used at the time of vending. The QR Code® to be read can also be code information such as a QR Code® directly put on the communication apparatus 101 or an accessory thereof. Further, a two-dimensional code other than the QR Code® or a one-dimensional bar code can be read. Further, instead of machine-readable information such as the QR Code®, a user-readable information can be read.

The present exemplary embodiment can also be realized when a program for implementing at least one of the above-described functions is supplied to a system or apparatus via a network or storage medium, and at least one processor in a computer of the system or apparatus reads and executes the program. The present exemplary embodiment can also be realized by a circuit (for example, an application specific integrated circuit (ASIC)) for implementing at least one of the functions.

According to the present exemplary embodiment, it is possible to efficiently provide communication parameters while reducing security risks.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While aspects of the present invention have been described with reference to exemplary embodiments, it is to be understood that the aspects of invention are not limited to the disclosed exemplary embodiments. The scope of the following claims is to be accorded the broadest interpretation so as to encompass all such modifications and equivalent structures and functions.

This application claims the benefit of Japanese Patent Application No. 2015-144396, filed Jul. 21, 2015, which is hereby incorporated by reference herein in its entirety.

What is claimed is:

1. A communication apparatus comprising:
one or more processors; and
one or more memories including instructions that, when executed by the one or more processors, cause the communication apparatus to:
acquire first information corresponding to another communication apparatus;
transmit, to the another communication apparatus by unicast, an authentication request message for requesting authentication processing to be performed for the communication apparatus to provide a communication parameter for communicating in a wireless network, in a case where the first information is acquired, a search request message is received from the another communication apparatus, and the search request message includes second information corresponding to the first information,
transmit the authentication request message by multicast or broadcast, in a case where the first information is acquired and the search request message is not received from the another communication apparatus, or in a case where the first information is acquired and the search request message received from the another communication apparatus does not include the second information.

2. The communication apparatus according to claim 1, wherein the communication apparatus acquires the first information by receiving a bar code or a two-dimensional code.

3. The communication apparatus according to claim 1, wherein the communication apparatus acquires the first information by receiving a predetermined signal including the first information from the another communication apparatus.

4. The communication apparatus according to claim 1, wherein the communication parameters include at least one of an identifier of the wireless network, an encryption key, an encryption method, an authentication key, or an authentication method.

5. The communication apparatus according to claim 1, wherein the communication parameters are information for performing wireless communication conforming to an IEEE 802.11 series standard.

6. The communication apparatus according to claim 3, wherein the predetermined signal is compliant with Bluetooth® or Near Field Communication (NFC).

7. The communication apparatus according to claim 1, wherein the first information is at least one of a Media Access Control (MAC) address and a Universally Unique Identifier (UUID) of the another communication apparatus, and a public key.

8. The communication apparatus according to claim 1, wherein the search request message is a probe request compliant with an IEEE802.11 series standard.

9. The communication apparatus according to claim 1, wherein
the first information comprises public key information of the another communication apparatus, and
the second information comprises a hash value of the public key.

10. The communication apparatus according to claim 1, wherein
the communication apparatus acquires the first information from the another communication apparatus.

11. A method for providing communications parameters for a communication apparatus, the method comprising:
acquiring first information corresponding to another communication apparatus;
transmitting, to the another communication apparatus by unicast, an authentication request message for requesting authentication processing to be performed for the communication apparatus to provide a communication parameter for communicating in a wireless network, in a case where the first information is acquired, a search request message is received from the another communication apparatus, and the search request message includes second information corresponding to the first information,
transmitting the authentication request message by multicast or broadcast, in a case where the first information is acquired and the search request message is not received from the another communication apparatus, or in a case where the first information is acquired and the search request message received from the another communication apparatus does not include the second information.

12. A non-transitory computer-readable storage medium storing computer executable instructions for causing a computer to execute a method for providing communication parameters for a communication apparatus, the method comprising:
acquiring first information corresponding to another communication apparatus;
transmitting, to the another communication apparatus by unicast, an authentication request message for requesting authentication processing to be performed for the communication apparatus to provide a communication parameter for communicating in a wireless network, in a case where the first information is acquired, a search request message is received from the another communication apparatus, and the search request message includes second information corresponding to the first information,
transmitting the authentication request message by multicast or broadcast, in a case where the first information is acquired and the search request message is not received from the another communication apparatus, or in a case where the first information is acquired and the search request message received from the another communication apparatus does not include the second information.

\* \* \* \* \*